United States Patent

Salvucci

[11] Patent Number: 6,116,623
[45] Date of Patent: Sep. 12, 2000

[54] DUAL CYLINDER CART WITH FIREWALL DIVIDER

[76] Inventor: Frank S. Salvucci, 7400 Del Canto, Bakersfield, Calif. 93309

[21] Appl. No.: 09/220,883

[22] Filed: Dec. 23, 1998

[51] Int. Cl.⁷ .................................................. B62B 1/00
[52] U.S. Cl. ................................... 280/47.26; 280/47.27; 280/79.5; 280/79.6; 280/79.7
[58] Field of Search .......................... 280/47.26, 47.27, 280/79.5, 79.6, 79.7

[56] References Cited

U.S. PATENT DOCUMENTS

| | | | |
|---|---|---|---|
| 1,244,030 | 10/1917 | Cave | 239/71 |
| 1,432,037 | 10/1922 | Russell | 280/47.27 |
| 4,253,716 | 3/1981 | Turner, Jr. | 280/47.26 |
| 4,625,949 | 12/1986 | Walker | 280/47.26 |
| 5,307,839 | 5/1994 | Loebker et al. | 137/899 |
| 5,431,422 | 7/1995 | Gamache | 280/47.19 |
| 5,570,895 | 11/1996 | McCue et al. | 280/47.19 |

*Primary Examiner*—J. J. Swann
*Assistant Examiner*—James S. McClellan
*Attorney, Agent, or Firm*—A. M. Fernandez

[57] ABSTRACT

A hand cart for transporting two cylinders, one with oxygen and the other with a liquified fuel gas, used in welding or metal cutting is provided with a firewall divider between the cylinders to protect the oxygen cylinders from a risk of rising cylinder pressure due to heat comprising a flue supported above the cart platform in order to allow cool air to be drawn in at the bottom as how air rises should leaking fuel on the gas side become ignited.

5 Claims, 3 Drawing Sheets

DUAL CYLINDER CART WITH FIREWALL DIVIDER

FIELD OF THE INVENTION

The invention relates to a two-wheel hand cart for transporting and holding oxygen and fuel cylinders used for welding or metal cutting, and more particularly to a hand cart with a firewall between the cylinders.

BACKGROUND OF THE INVENTION

It is common practice to use a single two-wheel hand cart for transporting two cylinders, one with oxygen and the other with acetylene, propane or other liquified fuel gas, to the site of the work to be done, be it welding or metal cutting, together with hoses connecting flow control assemblies to an adjustable torch flame. The control assemblies normally include valves and regulators comprising flow rate and pressure gauges. The complexity of the fuel control assembly presents a risk of fuel leakage at any time a manual fuel valve is open. If not detected before igniting the torch, the escaping fuel may be inadvertently ignited, thereby presenting a further risk that the flame generated by the fuel leak may heat the adjacent oxygen cylinder to such an extent that it increases the PSI level higher than an allowable safe pressure level prescribed by the Department of Transportation (DOT), thus triggering a pressure relief valve which adds oxygen to the ambient air. That makes the torch flame burn hotter.

The oxygen cylinder is usually much taller than the fuel cylinder that contains liquified fuel gas. Once the fuel valve on top of the dome of the cylinder is opened, the liquified fuel gas vaporizes and flows under pressure to the control assembly. Consequently, any leak in the control assembly, or at the coupling of the fuel hose to the assembly, could cause leaking fuel to be ignited near the midsection of the oxygen cylinder. To protect the oxygen cylinder from the flame, a single ¼" steel plate has been experimentally placed as a firewall between the cylinders. However, such a plate was found to be inadequate as a firewall because the heat on one side of the plate will be quickly conducted to and radiated from the other side at such a temperature that the PSI of the oxygen in the adjacent cylinder quickly rises. If the flame is not detected and the manual fuel valve closed in time, the oxygen pressure relief valve will be triggered causing the leaking fuel to produce a hotter flame, after which a greater disaster could ensue. Thus, an object of the present invention is to provide a firewall that will prevent initiation of such a disaster for an extended period to allow ample time to detect the flame and close the manual fuel control valve.

STATEMENT OF THE INVENTION

In accordance with the present invention, a two-wheel cylinder cart having an upright frame with a cart handle and a platform for both an upright fuel cylinder and an upright oxygen cylinder side by side is provided with a flue as a firewall supported upright over the platform between the cylinders. The firewall flue is preferably provided with a total air inlet space or gap between the bottom ends of the walls of the flue and the platform greater than the space within a cross section of the flue to adequately support the draft of hot air out at the top with cool air in at the bottom of the flue. However, it is not critical.

In a preferred embodiment, the firewall flue comprises first and second broad metal walls opposite each other supported between the cylinders and two narrower side walls enclosing the space between the broad walls so that the flue has a uniform rectangular cross section throughout its upright length, but in the broadest aspects of the invention that cross section may take other forms, such as trapezoidal, elliptical or variations thereof depending on the dimensions of the first and second walls and whether they are flat or arcuate, as in the rectangular or trapezoidal cross section with the first and second walls concave on the outside to conform generally to the curvature of the adjacent cylinders.

The means for supporting the flue over the platform in one embodiment comprises an inverted U-shaped frame secured to the flue, as by welding, and at least one welded spot between the cart frame cross member and the upper part of the flue. In another embodiment, the means for supporting the flue over the platform comprises an extension at the bottom of at least one of the metal walls forming the flue, and at least one welded spot between a cross member of the cart frame and the upper part of the flue.

Although the firewall is referred to throughout as a singular flue, it is shown below that a second flue sharing one broad wall of the first flue would be within the scope of the appended claims. Thus, the novel features that are considered characteristic of this invention are set forth with particularity in the appended claims directed to at least one flue, i.e., a single flue or one of two identical flues sharing one wall. The invention will best be understood from the following description when read in connection with the accompanying drawings.

DETAILED DESCRIPTION OF THE INVENTION

Figure 1:
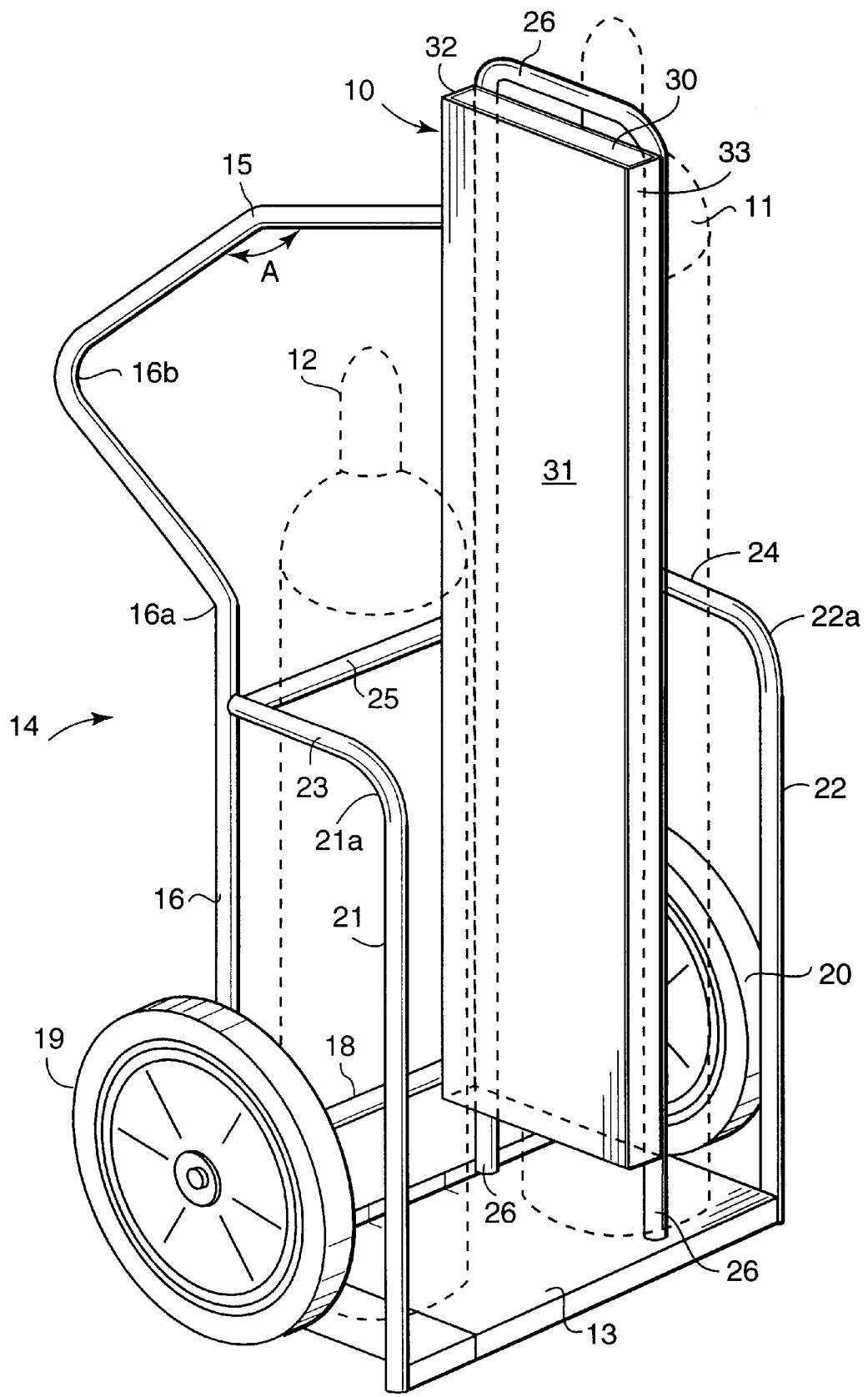
FIG. 1 illustrates a first embodiment of the present invention utilizing a U-shaped frame to support a flue as a firewall supported upright between cylinders over a cart platform.

Referring to FIG. 1, a dual cylinder cart is illustrated with a firewall divider 10 in the form of a flue between an oxygen cylinder 11 and a liquified gas cylinder 12 on a cart platform 13, both of which cylinders are shown in phantom. The cart comprises an upright frame 14 having a handle 15 at the upper end of two rear upright members 16, and a corresponding one on the right side hidden from view by the firewall 10, that are normally vertical as shown when the cart is at rest. Those two upright members and handle are preferably formed from a single metal tube that is first bent back slightly at 16a and then bent forward at 16b and toward the corresponding member on the right side to form the handle 15 as an inverted V with a wide angle A at the center of the handle as more fully described in a copending application titled TWO-WHEEL, LIQUID CYLINDER CART WITH ERGONOMIC HANDLE, which by this reference thereto is incorporated herein. However, a more conventional, straight handle can be used.

In order that the platform 13 may be tilted up on a cart axle 18 between wheels 19 and 20, the frame 14 includes two upright members 21 and 22 in front made of a metal tube bent back at 21a and 22a to form horizontal members 23 and 24 joined with a cross member 25 also made of a metal tube. These members 21 through 25 can be and are preferably made using a single tube bent in three places to form a unitary structure welded to the platform 13 at the foot of the front upright members 21 and 22 and welded to the rear upright members (16 and the corresponding one on the right behind the firewall) such that the cross member 25 is a part of the single tube. The firewall flue or divider 10 (hereinafter the flue) is supported above the platform 13 by an inverted U-shaped frame 26 preferably made of a bent metal tube the ends of which are welded to the platform 13. To steady the flue, the frame 26 and the flue are welded to the cross member 25.

The flue 10 is made from two sheets of metal. A first sheet of 12-gauge metal cut 14 inches wide is bent along both sides one inch from the edge to form three walls of the flue, a broad wall 12 inches wide and two narrow side walls one inch wide. A second sheet of 16-gauge metal cut 12 inches wide is then welded along both of its edges to the ends of the narrow side walls. Thus, the flue has a cross-sectional area of 12 square inches. Once formed, the flue, which is 12 inches wide, is welded to the frame 26, preferably the 16-gauge metal side of the flue adjacent the taller oxygen cylinder.

The bottom of the flue 10 is supported above the platform 13 a distance that assures a total gap (sometimes referred to herein as "total air inlet space") between it and the platform to support the draft of hot air out at the top end of the flue. That is preferably accomplished by having the total air inlet space about equal to or greater than the cross-sectional area of the flue. For example, a flue having a 2.54×30.5 cm cross-sectional area for the draft of air should have a minimum air inlet space, i.e., a gap of 1.17 cm between the bottom of the flue and the platform. For convenience of illustration, the gap is shown in FIG. 1 as though much larger (>5 cm). The requisite gap spacing of the flue over the platform is provided in the first embodiment by the frame 26 made in an inverted U-shape by bending a metal tube and welding the ends of the tube to the platform 13 and also welding the frame to the cross bar 25.

In operation, if any fuel leaking from the flow control assembly of the fuel cylinder is ignited, the flame will heat the 12-gauge metal side of the flue next to the shorter fuel cylinder. In time, the heat conducted through to the other side of the 12-gauge metal side will begin to radiate heat, but the flue draft prevents the 16-gauge wall next to the oxygen cylinder from being heated in a temperature that will cause the 16-gauge wall next to the oxygen cylinder to radiate heat because the flue provides a space of air to absorb the heat radiated by the 12 gauge wall, and as the air is heated, it rises and draws cool air in through the inlet air space or gap between the bottom of the flue and platform 13. As noted hereinbefore, without the flue the heat that would be radiated directly to and through the opposite wall of the flue to the oxygen cylinder would cause oxygen pressure to rise above a prescribed safe level. The hotter the leaking-fuel flame, the faster heated air in the flue and the greater the rate at which cool air is drawn in at the bottom. The result is to provide a self-regulated flow of cool air through the flue to prevent the wall of the flue on the fuel-cylinder side from heating the opposite wall on the oxygen-cylinder side through radiation, thus averting the risk of raising the oxygen pressure above the safe limit.

Figure 2:
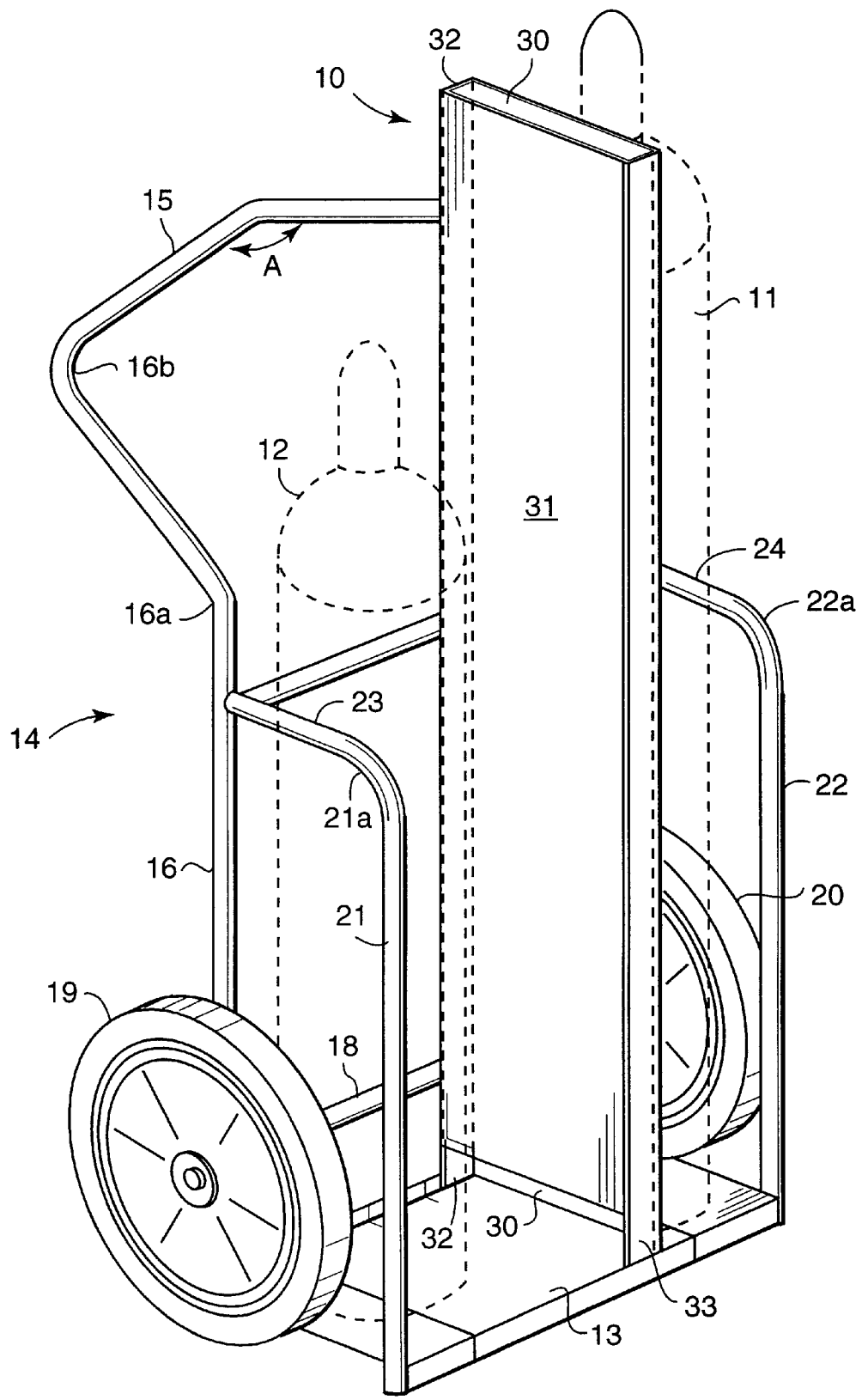
FIG. 2 illustrates a second embodiment of the present invention in which the firewall flue of FIG. 1 dispenses with the U-shaped frame and instead utilizes a downward extension of at least one wall of the flue, but preferably three, to support the flue above the cart platform and still provide an air inlet space.

In the second embodiment shown in FIG. 2, the total air inlet space is provided by having at least one wall of the flue, but preferably three as shown, extended down to the platform where it is secured, as by welding. In the case illustrated, the extended wall 30 is on the oxygen-cylinder side, but it could just as well be the opposite wall 31, and the two narrower end walls 32 and 33 between the two broad side walls. In either case, the extension of a flue wall (or walls) would reduce the air inlet space from that otherwise provided in the first embodiment, but the remaining total air inlet space is nevertheless made equal to or greater than the cross-sectional area of the flue by making the gap between the broad wall 31 and the platform 13 equal to or greater than one inch for a flue having a cross-sectional area of 1×12 inches. All of the members of the dual cylinder cart remain the same as to form and function, including the cross member 25 which in this second embodiment is welded to the end wall 32.

Figure 3:
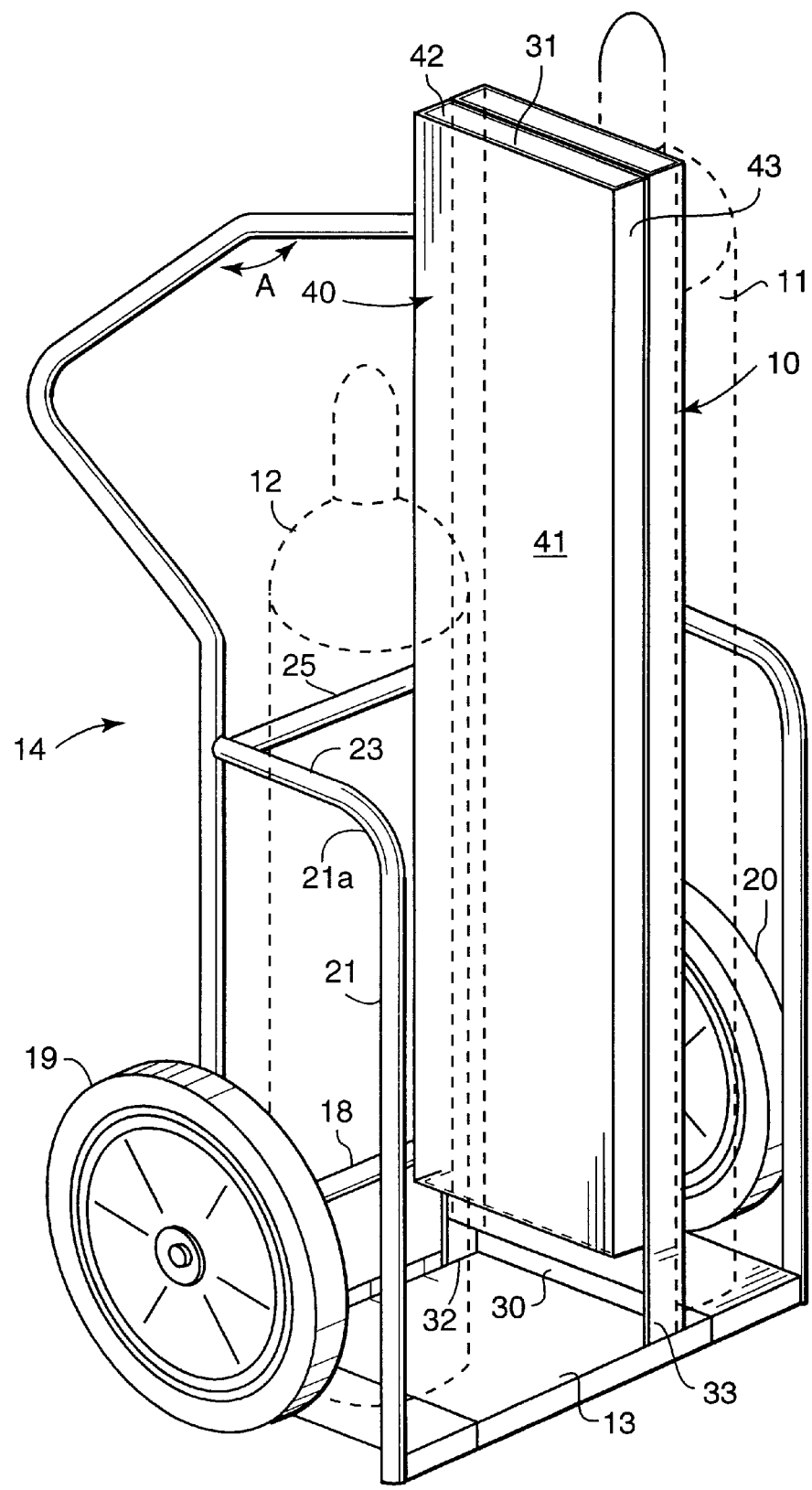
FIG. 3 illustrates a third embodiment in which the firewall flue of FIG. 2 is retained and a second flue is provided by welding onto it a sheet of cross-sectional C-shape bent metal with an even greater air inlet space than the first flue.

In a third embodiment shown in FIG. 3, all the members of the dual cylinder cart again remain the same as to form and function. The difference over the second embodiment is that a second but shorter flue 40 is juxtaposed with the first flue 10 and welded to the cross member 25. That is best accomplished by cutting a length of 16-gauge metal 14 inches wide and bending it along both sides one inch from the edge to form three walls 41, 42 and 43. The free edges of the walls 42 and 43 are then welded to the wall 31 of the flue 10 which otherwise remains the same as shown in FIG. 2. Because the flue 40 is shorter but juxtaposed with the top of the flue 40 even with the top of the flue 10, the total air inlet space of the second flue 40 is much greater than for the first flue 10 so that it does not impede the supply of inlet air to the first flue.

The cross-sectional area of the flue(s) illustrated in all three embodiments is rectangular, but may readily have other cross-sectional configurations, particularly in the single-flue embodiments, such as trapezoidal, with the wider wall on the fuel cylinder side. Another useful cross-sectional configuration for the single-flue embodiments would be with narrow end walls that are flat or convex (curved out on the outside) and broader side walls that are concave (curved in on the outside), such that the outside of the broader side walls conform generally to the shape of the two cylinders. Still other variations can occur to those skilled in the metal working art in both the cross-sectional configuration of the flue(s) and the nature of the support means for the flue(s) over the platform. Thus, although particular embodiments of the invention have been described and illustrated herein, it is recognized that modifications may readily occur to those skilled in the art. Consequently, it is intended that the claims be interpreted to cover such modifications and equivalents thereof.

What is claimed is:

1. A cylinder cart with a platform wide enough to support two cylinders and a firewall divider between said cylinders wherein said firewall divider comprises a flue of uniform cross-sectional area and means for supporting said flue upright between said cylinders above said platform, said flue having an inlet air space extending from the bottom of said flue to said platform, wherein said inlet air space is equal to or greater than said cross-sectional area.

2. A cylinder cart with a firewall divider as defined in claim 1 wherein said means for supporting said flue upright comprises an inverted U-shaped frame secured to said platform and a cross member of said cart parallel to and above a rear edge of said platform secured to a rear side of said flue.

3. A cylinder cart with a firewall divider as defined in claim 1 wherein said means for supporting said flue upright comprises a fraction of the total flue wall at the bottom end thereof proximate said platform extending to said platform and secured thereto, the extent of extension being selected to provide a total air inlet space between an unextended fraction of the total flue wall at the end thereof equal to or greater than said cross-sectional area of said flue and a cross member of said cart parallel to and above a rear edge of said platform secured to a rear side of said flue.

4. A cylinder cart with a firewall divider as defined in claim 3 wherein said flue is rectangular in cross section and said fraction of total flue wall at the end thereof proximate said platform extended to said platform consists of two end walls parallel to front and rear edges of said platform and one wall perpendicular to said two parallel end walls, and the extent of said extension being about equal or greater than the spacing of said two parallel end walls.

5. A cylinder cart with a firewall divider as defined in claim 4 wherein said firewall divider comprises an additional flue with a rectangular cross section juxtaposed and secured to said flue having a fraction of total flue wall at the bottom end thereof spaced away from said platform, said additional flue having a fraction of total flue wall at the bottom thereof not coextensive with a wall of said flue supported on said platform spaced above said platform with a total inlet air space equal to or greater than said total inlet air space of said flue supported on said platform.

* * * * *